US005684786A

United States Patent [19]
Schylander et al.

[11] Patent Number: 5,684,786
[45] Date of Patent: Nov. 4, 1997

[54] RECORD CARRIER HAVING AN INFORMATION VOLUME INCLUDING AUDIO INFORMATION AND AN INFORMATION VOLUME INCLUDING ADDITIONAL NON-AUDIO INFORMATION

[75] Inventors: Erik Christian Schylander, Eindhoven, Netherlands; Jos G. Schepers, Hasselt, Belgium; Gerrit D. Westerhout, Eindhoven; Adrianus H. Dieleman, Dordrecht, both of Netherlands

[73] Assignee: U.S. Philips Corporation, New York, N.Y.

[21] Appl. No.: 371,644

[22] Filed: Jan. 12, 1995

Related U.S. Application Data

[63] Continuation-in-part of Ser. No. 328,307, Oct. 24, 1994, abandoned, which is a continuation of Ser. No. 180,022, Jan. 11, 1994, abandoned, which is a continuation of Ser. No. 817,579, Jan. 7, 1992, abandoned, and a continuation-in-part of Ser. No. 977,396, Mar. 1, 1993, abandoned.

[30] Foreign Application Priority Data

| Apr. 2, 1991 | [EP] | European Pat. Off. | 91200764 |
| Apr. 26, 1991 | [EP] | European Pat. Off. | 91201005 |
| May 7, 1991 | [EP] | European Pat. Off. | 91111228 |

[51] Int. Cl.$^6$ .................................................. G11B 7/00
[52] U.S. Cl. ................................................... 369/275.3
[58] Field of Search ............ 369/32, 275.1–275.4, 369/48, 54, 58, 59

[56] References Cited

U.S. PATENT DOCUMENTS

| 4,847,708 | 7/1989 | Furuyama | 369/32 |
| 4,893,193 | 1/1990 | Nakamura et al. | 358/341 |
| 4,901,301 | 2/1990 | Senshu | 369/54 |
| 5,177,720 | 1/1993 | Kondo | 369/48 |
| 5,210,734 | 5/1993 | Sakurai | 369/49 |
| 5,313,443 | 5/1994 | Iitsuka | 369/48 |
| 5,315,400 | 5/1994 | Kurata et al. | 369/48 |

FOREIGN PATENT DOCUMENTS

| 0184195 | 6/1986 | European Pat. Off. . |
| 3820590 | 1/1989 | Germany . |
| 308975 | 4/1991 | Japan . |
| 8001328 | 6/1980 | WIPO . |

*Primary Examiner*—Nabil Hindi
*Attorney, Agent, or Firm*—Michael E. Marion

[57] ABSTRACT

A record carrier on which a first information volume and an additional information volume are recorded. The first information volume includes audio information, preferably recorded in accordance with the Compact Disc Digital Audio standard. The additional volume includes additional non-audio information related to the audio information recorded in the first information volume. The additional volume also includes control information for searching for information in both the first and the second information volumes. A dedicated data reading apparatus for such a record carrier firstly accesses the additional information volume. On the basis of the control information, the dedicate data reading apparatus can also access the audio information in the first information volume. An audio reading apparatus which can not handle the additional non-audio information automatically accesses the first information volume.

19 Claims, 4 Drawing Sheets

RECORD CARRIER HAVING AN INFORMATION VOLUME INCLUDING AUDIO INFORMATION AND AN INFORMATION VOLUME INCLUDING ADDITIONAL NON-AUDIO INFORMATION

CROSS REFERENCE TO RELATED APPLICATIONS

This application is a continuation in part of application Ser. No. 08/328,307, filed Oct. 24, 1994, now abandoned which is a continuation of application Ser. No. 08/180,022, filed Jan. 11, 1994, now abandoned which is a continuation of application Ser. No. 07/817,579, filed Jan. 7, 1992 and now abandoned; and application Ser. No. 07/977,396, filed Mar. 1, 1993, now abandoned.

BACKGROUND OF THE INVENTION

The invention relates to a record carrier on which an information volume is recorded in a track thereof. The information volume has a program area including audio information (preferably formatted in accordance with the Compact Disc Digital Audio standard), and a lead-out area including a lead-out signal denoting the end of the information volume.

There exists a need for recording additional non-audio information together with the audio information on a record carrier. This additional non-audio information may be information which enables interactive access of the audio information recorded on the record carrier. However, this additional non-audio information may also be other types of information, such as, text or image information to be displayed during the reproduction of the audio information, or background information about an author, artist or music.

A known format for recording the latter types of additional non-audio information is the so-called CD-ROM format. Another known format for recording the latter types of additional non-audio information is the so-called CD-I format. The CD-I format and/or the CD-ROM format make it possible to record on a record carrier both a track with additional non-audio (CD-I or CD-ROM) information, i.e., a CD-I track or a CD-ROM track, and a track with audio information, i.e., an audio track, in a format which corresponds with the format of audio tracks as prescribed by the Compact Disc Digital Audio standard.

When additional non-audio (CD-I or CD-ROM) information is recorded in the main channel of a CD-audio disc (i.e., a disc which is in accord with the Compact Disc Digital Audio standard), it is prevented from being reproduced as audio information because it results in the production of noise. In some types of CD-audio players presently in use, this prevention is realized by checking whether a disc is a CD-audio disc, and if it is not, inhibiting the playback of the disc.

A disadvantage of a CD-I disc and a CD-ROM disc, as prescribed by the present version of the CD-I and CD-ROM standards, respectively, is that the first track must be a CD-I track or CD-ROM track. This means that a CD-audio track on a CD-I disc or CD-ROM disc cannot be indicated with track number "1". This may result in the ordinary user being confused because he or she will expect the track with track number "1" to be the first (audio) program track on the disc.

SUMMARY OF THE INVENTION

It is an object of the invention to provide a record carrier, having audio information recorded thereon, on which additional non-audio information has also been recorded such that the record carrier can be played by a dedicated player which uses the additional non-audio information for control of reproduction and which can also be played by means of audio players without resulting in an undesired access to the additional non-audio information. According to the invention, this object is achieved by a record carrier having a track, comprising:

- a first information volume recorded in the track in a first area, the first information volume including audio information in a first program area of the first area, and a first lead-out signal in a first lead-out area at the end of the first area, the first lead-out signal denoting the end of the first information volume; and

- an additional information volume recorded in the track in an additional area after the first area, the additional information volume including additional non-audio information related to the audio information in the first volume in an additional program area of the additional area, and an additional lead-out signal in an additional lead-out area at the end of the additional area, the additional lead-out signal denoting the end of the additional information volume.

A record carrier according to the invention does not contravene the requirements as prescribed in the Compact Disc Digital Audio standard. As a result, a CD-audio player will be able to play a CD-disc in accordance with the invention. Furthermore, such a disc is able to indicate a track with audio information as track "1".

A record carrier in accordance with the invention can also be played by a dedicated player which is designed to playback record carriers having more than one information volume (i.e., multi-volume or multi-series discs).

The invention is in particular suitable for providing a CD-disc with both audio information and additional non-audio information such as CD-ROM information or CD-I information. A CD-disc in accordance with the invention can be played by both a CD-audio-player and a CD-I player or CD-ROM player. However, it is to be noted that the invention is not limited to CD-disc record carriers.

BRIEF DESCRIPTION OF THE DRAWINGS

The invention and embodiments thereof will be described in detail below with reference to the following drawing, in which.

DESCRIPTION OF THE PREFERRED EMBODIMENTS

Figure 1:
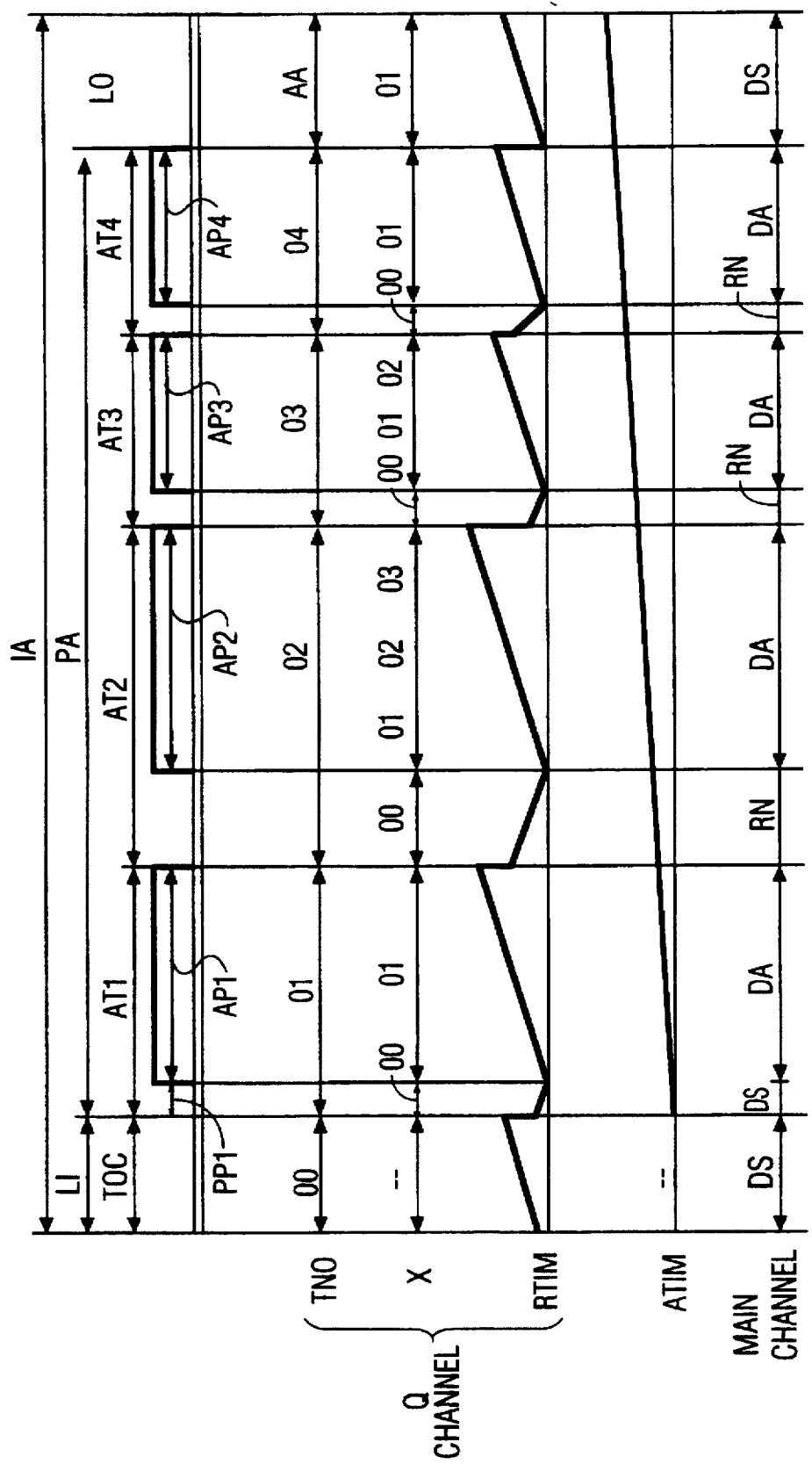
FIG. 1 shows a lay-out of a record carrier formatted in accordance with the Compact Disc Digital Audio standard.

Before discussing the invention in detail, the format of the prior art Compact Disc Digital Audio standard will be explained first with reference to FIG. 1. FIG. 1 shows the layout of a typical CD-audio disc. The area of the disc in which information has been recorded is indicated as the information area IA. The information area IA is divided into a lead-in area LI, a program area PA and a lead-out area LO.

The program area PA of FIG. 1 comprises four audio tracks, indicated by AT1, . . . , AT4. Each audio track comprises an audio part in which audio information has been recorded. The audio parts are indicated as AP1, ..., AP4.

The Compact Disc Digital Audio standard prescribes that the audio track AT1 comprises a prepart PP1 that directly precedes the audio part AP1. In the prepart PP1, pause information is recorded which results in a reproduction of silence when played. (Such pause information is hereinafter referred to as "digital silence").

The audio parts of audio tracks AT1, ..., AT4 of FIG. 1 may be separated by digital silence DS or so called room noise. Room noise is a digitized analog silence signal. The audio information and the digital silence in the audio tracks of FIG. 1 are included in a so-called main channel. In FIG. 1, the parts of the main channel provided with digital silence are indicated with DS, and the parts of the main channel provided with the room noise are indicated with RN. In addition, the parts of the main channel provided with audio information are indicated with DA. It is noted that the lead-in area LI and the lead-out area LO of the main channel are provided with digital silence DS.

In a so-called subcode Q channel, control information is included. In the program area PA, the subcode Q channel includes address information in the form of absolute time codes, ATIM, indicating the playing time expired from the beginning of the program area PA. The values of the absolute time codes ATIM as a function of the position within the program area PA is shown in FIG. 1. Further, in the program area PA, the subcode Q channel includes a track number code TNO, an index code X and a relative time code RTIM. In the parts of the audio tracks containing digital silence or room noise, the index code X has the value 00. The audio parts of the audio tracks start with the index value 01. The values of TNO, X and RTIM are shown in FIG. 1. In the lead-in area LI, the subcode Q channel comprises a table of contents TOC, which has a format as prescribed by the Compact Disc Digital Audio standard. The table of contents TOC includes the absolute time codes ATIM indicating the start location of the audio parts AP1, ... AP4 of the audio tracks AT1, ..., AT4. In addition, the table of contents TOC includes an indication that the disc is a CD-audio disc.

When a CD-audio disc is played by a CD-player, the CD-player first reads the table of contents TOC. Then, the CD-player detects, on the basis of the contents of table of contents TOC, whether the disc is a CD-audio disc. In some types of CD-audio players, the playback of the program area PA is inhibited in the event that the disc loaded in the player is not detected as being a CD-audio disc. However, if the presence of a CD-audio disc is detected, then a track jump to a part of the disc just before the start location of the audio part of the first audio track or a user selected audio track is performed. In doing the track jump, the information included in the table of contents TOC is used to determine the destination of the track jump. After the track jump, the scanning spot of the CD-player lands just before the start location of the audio part of the desired audio track. Since digital silence or room noise is recorded at the landing location of the scanning spot, silence or room noise will be reproduced for a short time until the scanning spot reaches the start location of the audio information.

A prior art CD-ROM system will now be briefly described with reference to FIGS. 2-4. A CD-ROM system comprises an optically readable disc on which information is recorded according to the CD-ROM standard (as described in the ISO 9660 standard) and a CD-ROM reading apparatus for reading the disc. The information recorded on the disc comprises main information and sub-code information. The main information is subdivided into sectors. The sub-code information is subdivided into sub-code frames.

Figure 2:
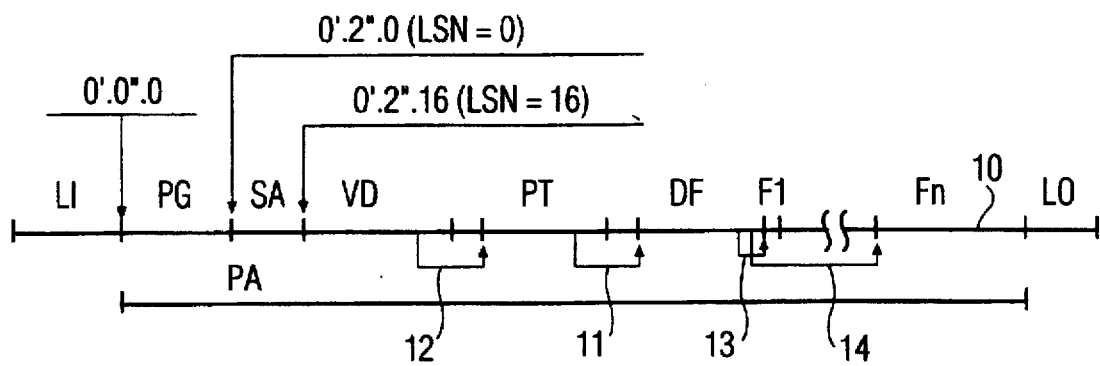
FIGS. 2—4 show a CD-ROM reading apparatus according to the prior art.

FIG. 2 diagrammatically shows the layout of a track 10 of a CD-ROM disc. The track 10 comprises a lead-in area LI, a program area PA and a lead-out area LO.

The program area PA of FIG. 2 is used for storing user information. The main information in the program area PA is subdivided into sectors having a length corresponding to that of a sub-code frame. Each of the sub-code frames in the program area PA has an absolute time code denoting the position at which that sub-code frame is recorded relative to the beginning of the program area PA. Each of the sectors also has an absolute time code corresponding to the absolute time code of the sub-code frame recorded together therewith.

The program area PA of FIG. 2 comprises a pregap PG in which no main information is recorded and which can be used for synchronizing the read out. The pregap PG extends from absolute time code 0'.0".0 to absolute time code 0'.2".0.

The pregap is followed by a system area SA reserved for use by the system. The system area SA extends from absolute time code 0'.2".0 to absolute time code 0'.2".16.

The system area SA is followed by a volume descriptor VD beginning at absolute time code 0'.2".16 on each CD-ROM disc. The length of the volume descriptor VD is not fixed but depends on the selected use of the CD-ROM. The volume descriptor VD comprises information about its length and is terminated by a code pattern denoting the end thereof.

The program area PA further comprises a path table PT, one or more directory files DF and user files F1, ..., Fn. The path table PT comprises information about the directory structure of the information stored on the disc and includes references to sector addresses of the directory files DF. In FIG. 2, the reference to the initial sector address of the directory file DF is denoted by line 11. The volume descriptor VD includes a reference, denoted by line 12, to the initial sector address of the path table PT. The directory file(s) DF comprise information about the structure of the user files F1, ..., Fn stored on the disc and include references, denoted by lines 13 and 14, for example, to the sector addresses in which the user files of the directory concerned, for example, F1 and Fn, are stored. The path table PT and directory file DF makeup the control information necessary for searching for the user files F1, ..., Fn.

Figure 3:
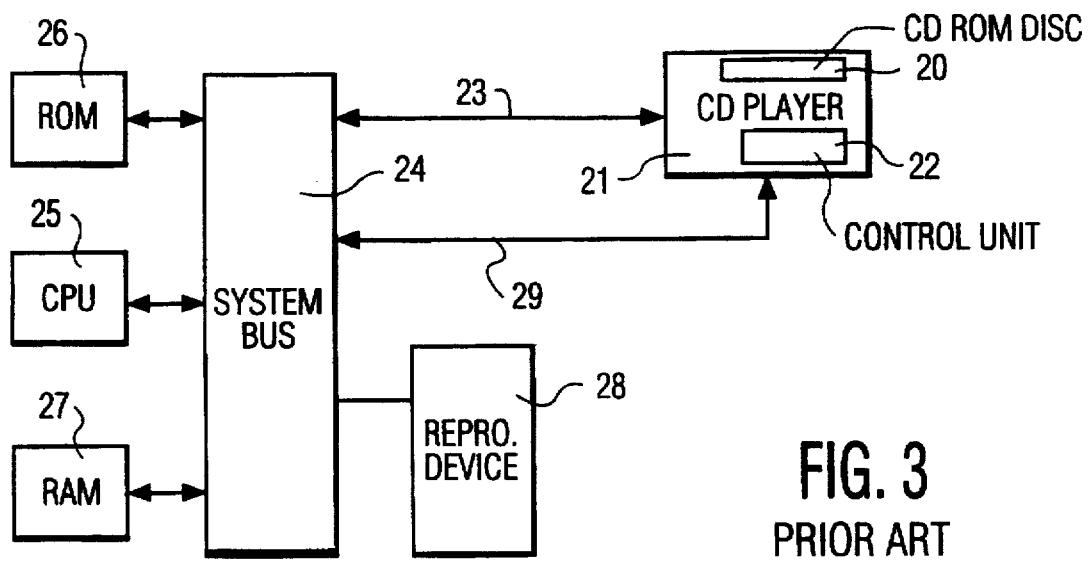

FIG. 3 diagrammatically shows a CD-ROM reading apparatus for reading a CD-ROM disc 20. The CD-ROM reading apparatus comprises a CD player 21 having an output which is coupled to a system bus 24 of a customary computer system via a data signal path 23 for delivering read information. A central processor 25, a ROM 26, a RAM 27 and one or more information reproducing devices 28 are connected to the system bus 24.

The CD player 21 of FIG. 3 comprises a control unit 22 for searching for information on the basis of sector addresses received over a control signal path 29. The control signal path 29, like the data signal path 23, is also connected to the system bus 24.

Software for the central processor 25 is loaded in the ROM 26. This software customarily comprises an operating system. One of the tasks of the operating system is, for example, to control and monitor the data transport between the elements of equipment connected to the system bus 24.

Figure 4:
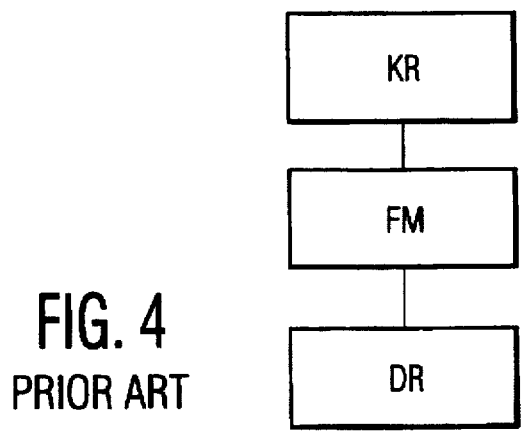

FIG. 4 diagrammatically shows the structure of a customary operating system such as, for example, the OS9 operating system. Such an operating system comprises a kernel KR, a file manager FM and a device driver DR. In the case where information is to be read from the files present on the CD-ROM disc 20, the kernel KR sends an I/O request to the file manager FM. On the basis of the received I/O request, the file manager FM decides which sector or sectors are to be read out and indicates to the device driver DR, by means of one or more logic sector numbers LSN, which sector(s) of the disc are to be read out.

The logic sector numbers LSN do not match the absolute time codes in the sectors on the CD-ROM disc 20. However, there is a fixed relation between the logic sector numbers LSN and the absolute time codes. This relation is as follows: LSN=((((MIN*60)+SEC)*75+FR)−150) for the absolute time code MIN'.SEC".FR. This means that the first sector of the signal area SA is denoted LSN=0, and the first sector of the volume descriptor VD is denoted LSN=16. On the basis of the received logic sector number(s) LSN, the device driver DR derives the necessary control signals for the control unit 22 to search for the desired sector(s) and read it (them) out.

Before a requested user file, for example, file F1, can be read out, the information in the volume descriptor VD, the path table PT and the directory file(s) DF must have been read out. This reading operation takes place during the log-on procedure and/or in reaction to I/O requests made to this effect by the kernel KR. During this operation, the file manager FM sends corresponding logic sector numbers LSN to the device driver DR.

Figure 5:
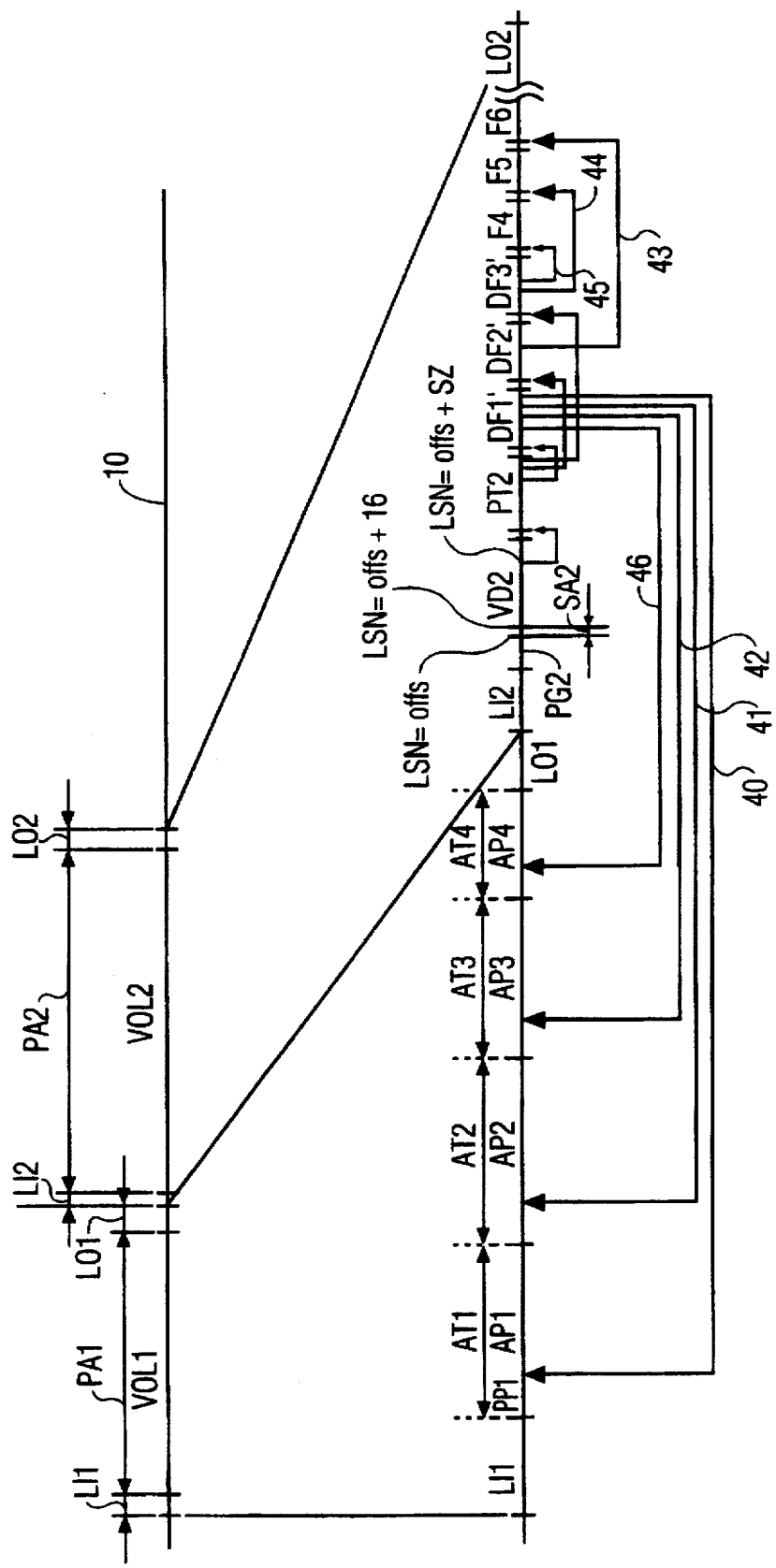
FIG. 5 shows an embodiment of a record carrier according to the invention.
Figure 6:
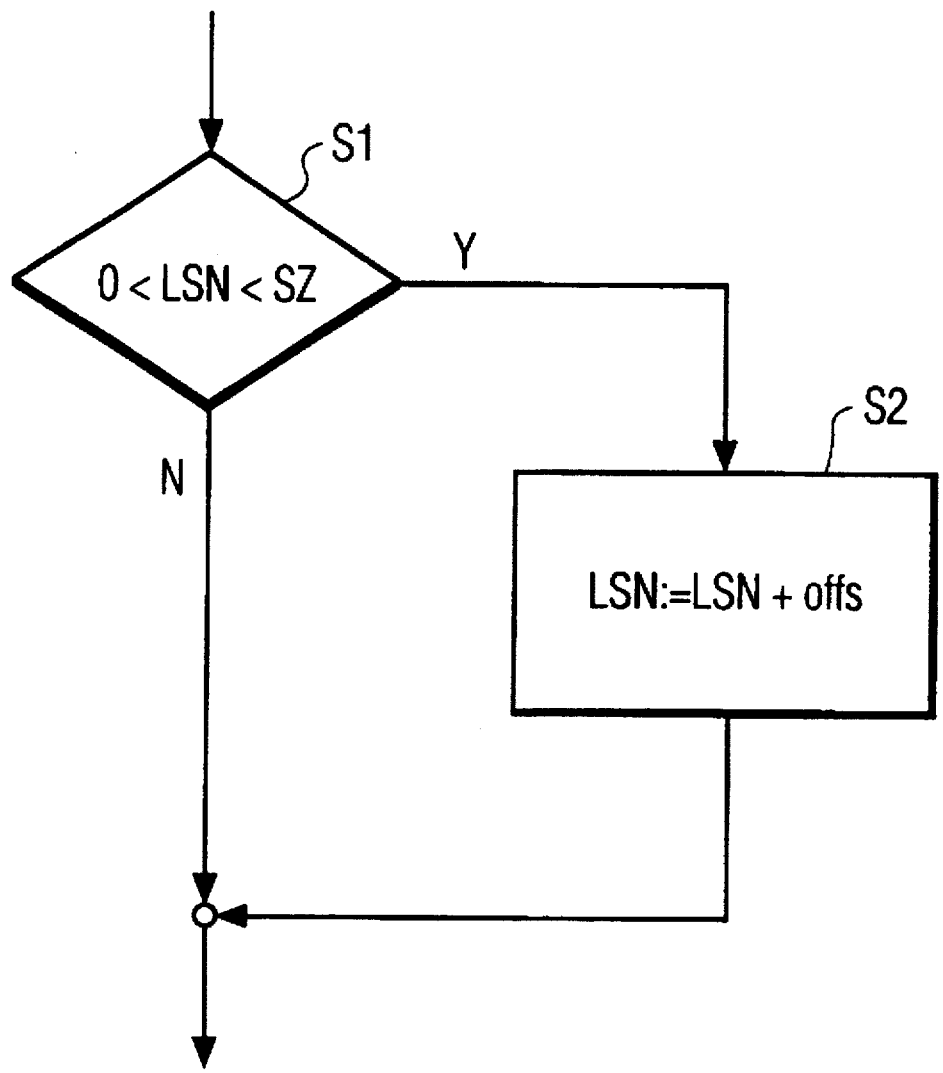
FIG. 6 shows a flow chart of a program executed by an embodiment of a reading apparatus relating to the invention.

Embodiments of a record carrier according to the invention will be described and explained. Reference is made to FIGS. 5 and 6.

FIG. 5 diagrammatically shows the layout of a track 10 on a record carrier. The track 10 comprises a first information volume VOL1 having a lead-in area LI1, a program area PA1 and a lead-out area LO1, recorded in the same fashion as described with reference to FIG. 1.

Contiguous to the information volume VOL1 of FIG. 5, a second information volume VOL2 is recorded. The second information volume VOL2 has a lead-in area LI2, a program area PA2 and a lead-out area LO2. The information in the program area PA2 is arranged in a similar fashion as described with reference to FIG. 2.

The program area PA2 of the second information volume VOL2 of FIG. 5 comprises a system area SA2 and a volume descriptor VD2. The system area SA2 and the volume descriptor VD2 of the second information volume VOL2 are located at the same predetermined distances from each other and the beginning of its program area PA2 as the system area SA and volume descriptor VD of the information volume shown in FIG. 2 are from each other and the beginning of its program area PA.

In FIG. 5, the beginning of the system area SA2 is denoted by the logic sector number LSN=offs, instead of LSN=0, as is the case for CD-ROM disc described with reference to FIG. 2. The beginning of the volume descriptor VD2 is denoted by logic sector number LSN=offs+16. The end of the volume descriptor VD2 is denoted by the logic sector number LSN=offs+SZ.

The program area PA2 of the second information volume VOL2 of FIG. 5 also comprises a path table PT2; directory files DF1', DF2' and DF3'; and user files F4, F5 and F6. The volume descriptor VD2 includes a reference to the initial sector address of the path table PT2. The path table PT2 comprises information about the structure of the directories included in second information volume VOL2. The path table PT2 also includes references to the initial sector addresses of the directory files DF1', DF2' and DF3'. The directory files DF1', DF2' and DF3' comprise information about the structure of the user files included in the directory concerned, i.e., user files F4, F5 and F6, and include references to addresses of those user files and the audio tracks AT1, . . . , AT4 in the first information volume VOL1.

The references to the user files F4, F5 and F6 in the second information volume VOL2 of FIG. 5 are denoted by the reference numerals 43, 44 and 45, respectively. The reference numerals 43, 44 and 45 denote the initial address sector of the user files F3, F4 and F5, respectively. The references to the audio tracks AT1, . . . , AT4 in the first information volume VOL1 of FIG. 5 are denoted by the reference numerals 40, 41, 42 and 46. The reference numerals 40, 41, 42 and 46 denote the beginning of the audio parts AP1, . . . , AP4 in the audio tracks AT1, . . . , AT4, respectively.

In the embodiment shown in FIG. 5, the volume descriptor VD2 includes a reference to the path table PT2. The path table PT2 includes a reference to the directory files, DF1', DF2' and DF3', with the necessary information for accessing all user files F4, F5 and F6 in the second information volume VOL2 and all audio tracks AT1, . . . , AT4 in the first information volume VOL1. Instead of including references to the audio tracks in a directory file of the second information volume VOL2, it is also possible to include those references in a user file of the second information volume VOL2, for example, together with a program for performing access to the first information volume VOL1.

The lead-out areas LO1 and LO2 of the record carrier of FIG. 5 each includes a lead-out signal. The lead-out signal in each lead-out area denotes the end of the information volume that lead-out signal is included in.

FIG. 6 shows a program (i.e., a modification program) used by the device driver DR of the operating system of FIG. 2 through which access can be gained to all of the user files and audio tracks included in the first and second information volumes VOL1 and VOL2 of FIG. 5. The program comprises a detection step S1 for detecting whether the logic sector number LSN received from the file manager FM is located in the range 0-SZ. This range includes the sector addresses of the volume descriptor VD of a prior art, single volume, CD-ROM disc. If the received logic sector number LSN is located in this range, step S2 is executed. In that step, the received logic sector number LSN is modified by adding thereto the value of offs. As a result of the program, when a request for access to a volume descriptor is made, access is gained to volume descriptor VD2 of the record carrier shown in FIG. 5, rather than where the volume descriptor VD of a single volume CD-ROM disc would normally be located. Through the volume descriptor VD2, access to all the required information present in the path table PT2 and the directory files DF1', DF2' and DF3' for searching for all of the user files F4, F5 and F6 in the information volume VOL2 and all of the audio tracks AT1, . . . , AT4 in the information volume VOL1 can be gained. Hence all of the user information on the record carrier of FIG. 5 is accessible.

To adequately modify the logic sector numbers, the values of offs and SZ need to be known by the device driver DR. If these values are known to the operator of a player, these values may be fed to the player by the operator in a customary fashion, for example, by means of a keyboard.

It is preferably, however, for a record carrier of the type shown in FIG. 5 to comprise a reference to the one or more sector addresses of the volume descriptor VD2 of the second information volume VOL2. This may be effected by including a reference to the initial sector address of the volume descriptor VD2 in the lead-out area LO2 of the second volume VOL2, for example, in the sub-code information. The reference may be the value of offs. The reference to the initial sector address of the volume descriptor VD2 can be searched for in a manner described, for example, in U.S. patent application Ser. No. 08/180,002, filed Jan. 11, 1994 and awaiting issuance, which application is incorporated herein by reference.

Access to the audio tracks included in the first information volume VOL1 of the record carrier of FIG. 5 is preferably made under control of programs read from the second information volume VOL2. Preferably those programs are read-out of the second information volume VOL1 and stored in a program memory of a program controlled control unit.

The information in the program area PA1 of the first information volume VOL1 of the record carrier of FIG. 5 is formatted in accordance to the Compact Disc Digital Audio standard, so that a prior art CD-audio player can reproduce the audio information recorded in the program area PA1. Since most of the CD-audio players already on the marked need information included in a table of contents recorded in the lead-in area LI of a disc, it is preferred to record in the lead-in area LI1 of the first volume information VOL1 a table of contents of a type which is recognized as a table of contents by CD-audio players already on the market. Preferably the table of contents in the lead-in area LI1 of the first information volume VOL1 is formatted in a manner which does not contravene the Compact Disc Digital Audio standard. This means that every CD-audio player already on the market will be able to playback the first information volume VOL1 of a record carrier of the type shown in FIG. 5. The information in the program area PA2 of the second information volume VOL2 of the record carrier of FIG. 5 is formatted in accordance to the CD-ROM standard.

Since a CD-audio player is only able to access information in the first information volume VOL1 of the record carrier of FIG. 5 (normally a CD-audio disc has only one information volume), the CD-audio player will not access the CD-ROM information in the second information volume VOL2. On the other hand, a CD-ROM player having the program described above, will be able to access the information in both information volumes. Preferably, a CD-ROM player will access the second information volume VOL2 (with CD-ROM information) before it accesses the first information volume VOL1 (with audio information).

It is advantageous to include in the table of contents in the lead-in area LI1 of the first information volume VOL1 of the record carrier of FIG. 5 an indication that it has more than one volume, so that a CD-ROM player can skip to the second information volume VOL2 (with the CD-ROM information). It is also possible, in accordance with that which is disclosed by U.S. patent application Ser. No. 08/180,002, for a CD-ROM player to search for the lead-out area of the last recorded area, i.e., the lead-out area LO2 of the second information volume VOL2 and obtain a reference to the volume descriptor VD of the last area, i.e., a reference to volume descriptor VD2 of the second information volume VOL2.

We claim:

1. A record carrier having a track, comprising:
   a first information volume recorded in the track in a first area, the first information volume including audio information in a first program area of the first area, and a first lead-out signal in a first lead-out area at the end of the first area, the first lead-out signal denoting the end of the first information volume; and
   an additional information volume recorded in the track in an additional area after the first area, the additional information volume including additional non-audio information related to the audio information included in the first program area in an additional program area of the additional area, and an additional lead-out signal in an additional lead-out area at the end of the additional area, the additional lead-out signal denoting the end of the additional information volume;
   wherein the additional information volume further includes pointer information which enables audio information included in the first program area to be located on the basis of information identifying one or more locations in the first program area where one or more portions of the audio information included in the first program area are located.

2. The record carrier as claimed in claim 1, wherein the additional information volume further includes a control file in a control area of the additional area which is separate from the additional lead-out area, the control file including control information for use in searching for audio information included in the first program area.

3. The record carrier as claimed in claim 2, wherein the first information volume further includes a table of contents indicating addresses within the first program area of predetermined parts of the audio information included in the first program area, the table of contents being included in lead-in area of the first area preceding the first program area.

4. The record carrier as claimed in claim 2, wherein the audio information in the first program area is formatted in accordance with the Compact Disc Digital Audio standard.

5. The record carrier as claimed in claim 4, wherein the additional non-audio information in the additional program area is formatted in accordance with the CD-ROM standard.

6. The record carrier as claimed in claim 1, wherein the first information volume further includes a table of contents indicating addresses within the first program area of predetermined parts of the audio information included in the first program area, the table of contents being included in lead-in area of the first area preceding the first program area.

7. The record carrier as claimed in claim 6, wherein the audio information in the first program area is formatted in accordance with the Compact Disc Digital Audio standard.

8. The record carrier as claimed in claim 7, wherein the additional non-audio information in the additional program area is formatted in accordance with the CD-ROM standard.

9. The record carrier as claimed in claim 7, wherein the table of contents is formatted in accordance with the Compact Disc Digital Audio standard.

10. The record carrier as claimed in claim 6, wherein the table of contents is formatted in accordance with the Compact Disc Digital Audio standard.

11. The record carrier as claimed in claim 1, wherein the audio information in the first program area is formatted in accordance with the Compact Disc Digital Audio standard.

12. The record carrier as claimed in claim 11, wherein the additional non-audio information in the additional program area is formatted in accordance with the CD-ROM standard.

13. The record carrier as claimed in claim 1, wherein the additional non-audio information in the additional program area is formatted in accordance with the CD-ROM standard.

14. The record carrier as claimed in claim 1, wherein the pointer information is included in the additional program area.

15. The record carrier as claimed in claim 1, wherein the additional area further includes a lead-in area at the beginning of the additional area, the lead-in area being located after the first lead-out area and before the additional program area; and the pointer information is included in the additional program area.

16. The record carrier as claimed in claim 15, wherein the pointer information includes one or more references identifying one or more locations in the first program area where one or more portions of the audio information included in the first program area are located.

17. The record carrier as claimed in claim 1, wherein the pointer information includes one or more references identifying one or more locations in the first program area where one or more portions of the audio information included in the first program area are located.

18. The record carrier as claimed in claim 1, wherein the first area further includes a first lead-in area at the beginning of the first area, the first lead-in area being located before the first program area; and the additional area further includes an additional lead-in area at the beginning of the additional area, the additional lead-in area being located after the first lead-out area and before the additional program area.

19. The record carrier as claimed in claim 2, wherein the control information includes reference information which references the pointer information.

* * * * *